Oct. 21, 1930.  J. B. DAVIS  1,779,270
LIQUID DISPENSING APPARATUS
Filed March 31, 1928   5 Sheets-Sheet 4
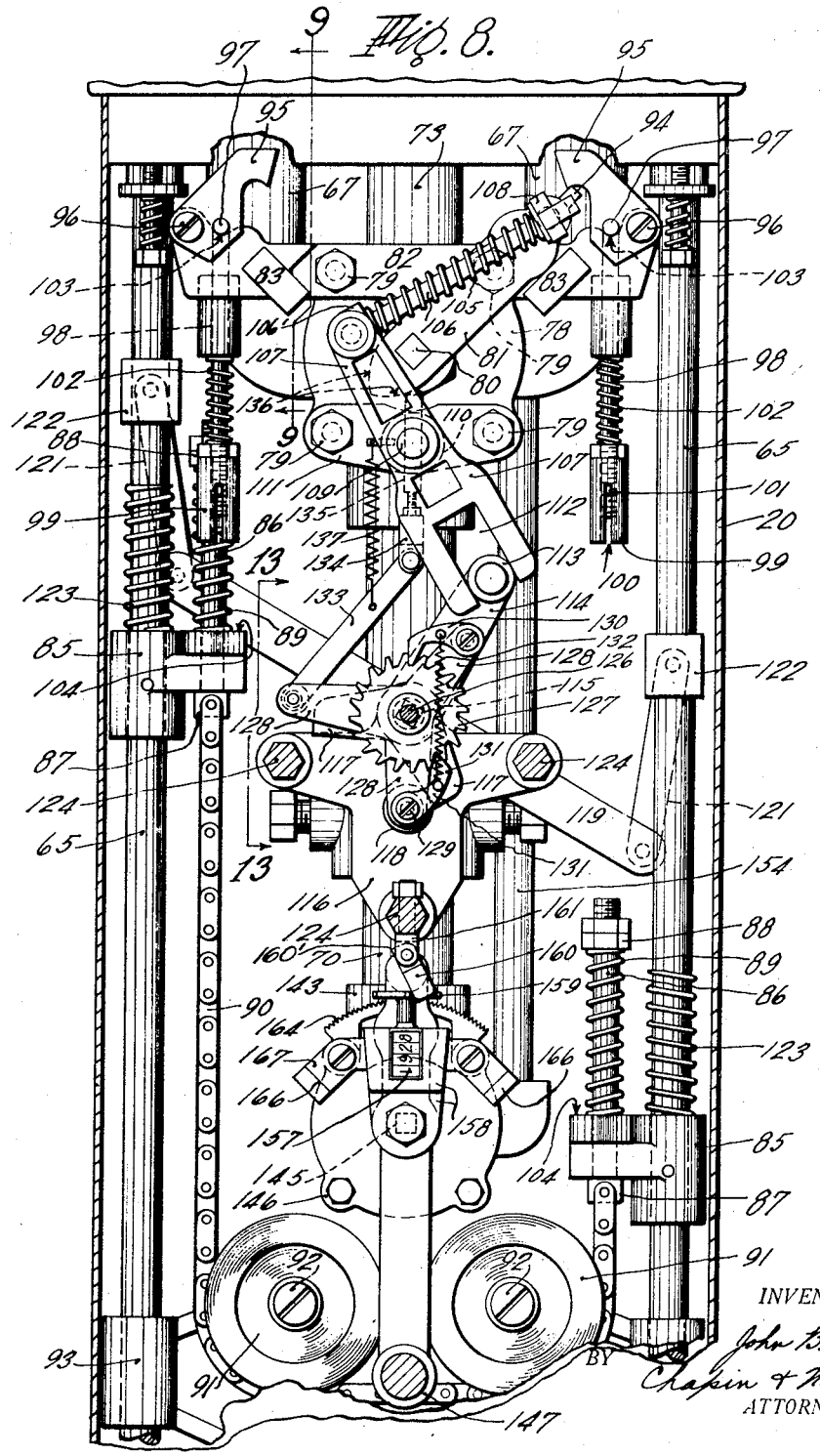
INVENTOR.
John B. Davis
BY Chapin & Neal
ATTORNEYS.

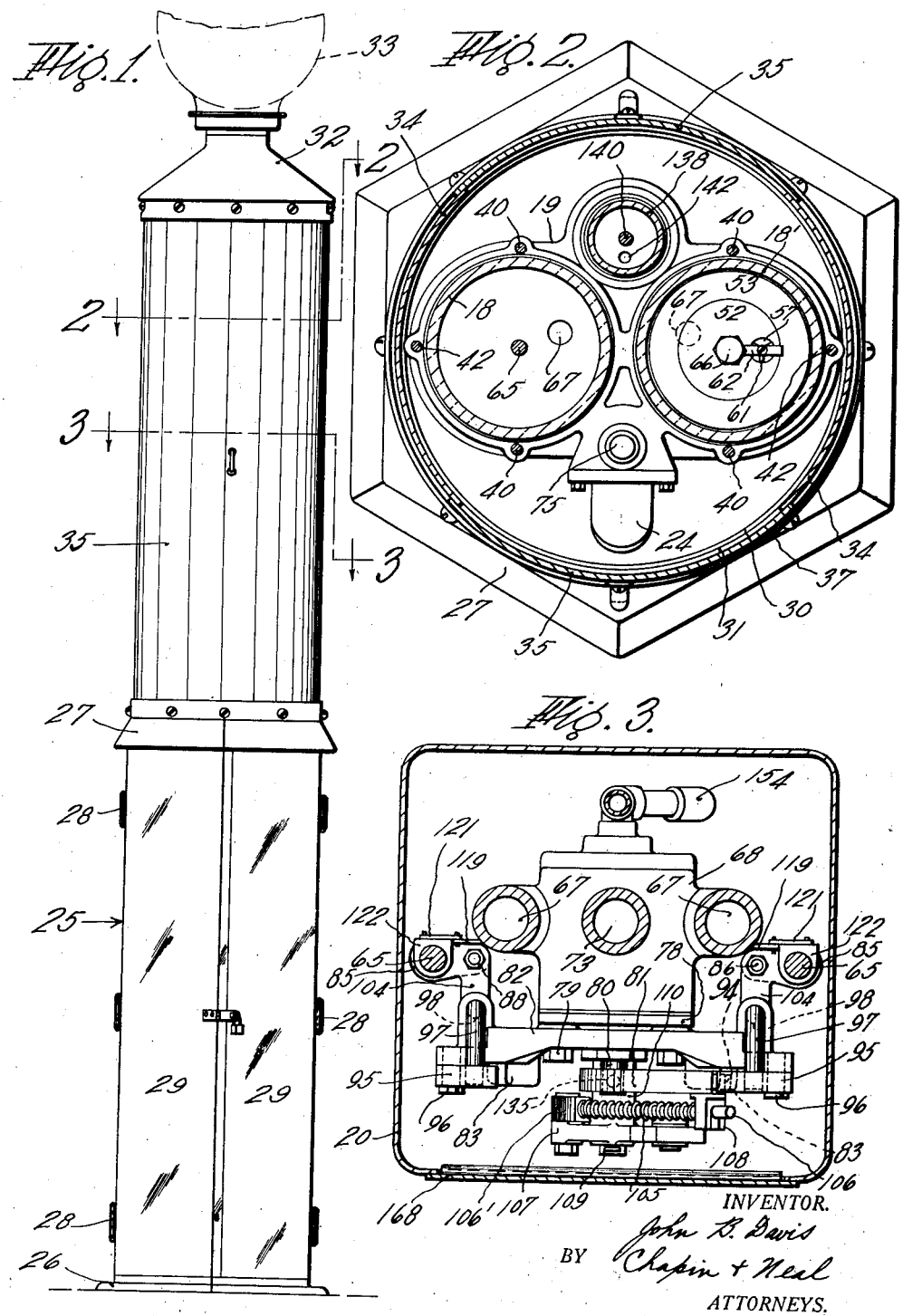

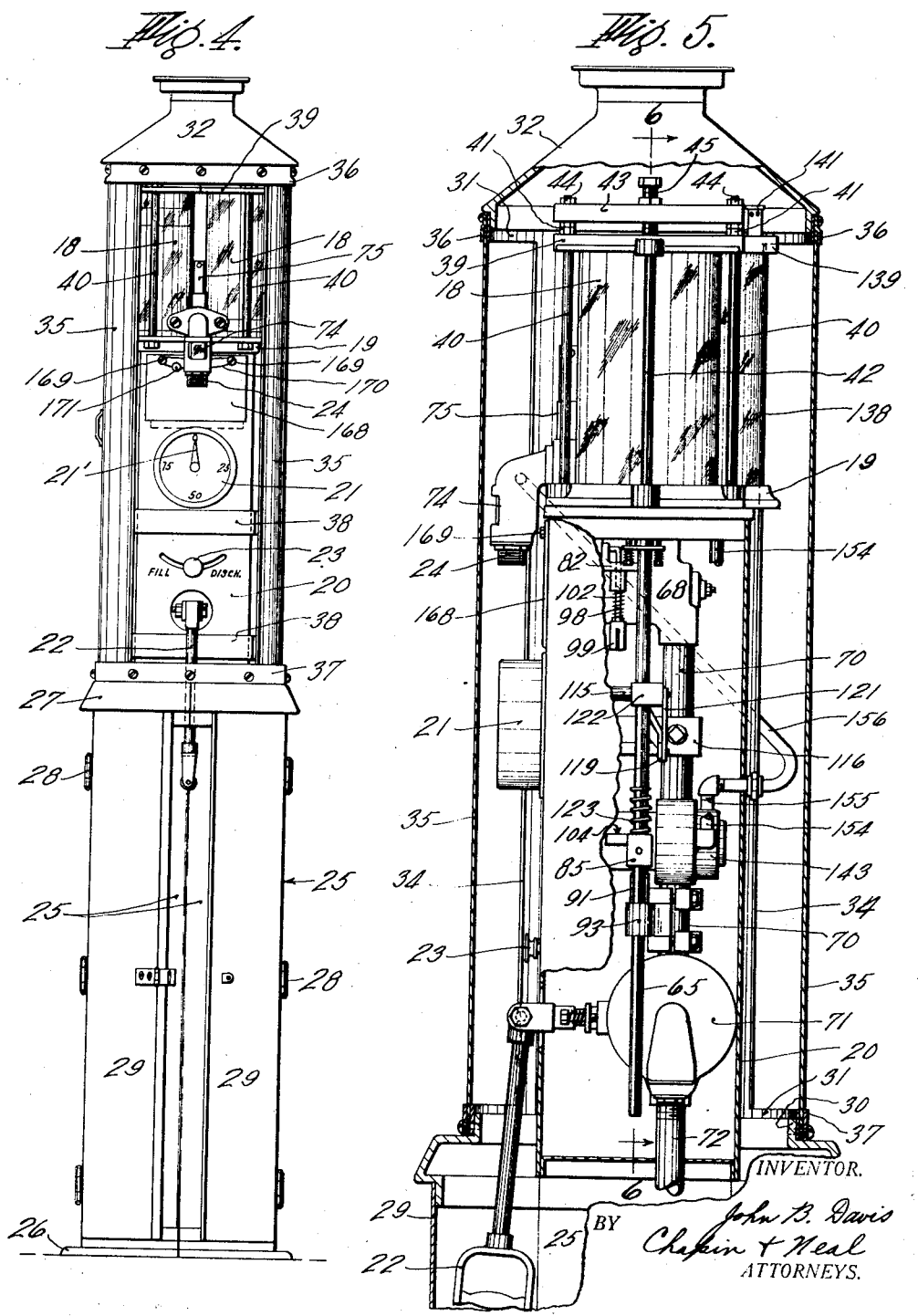

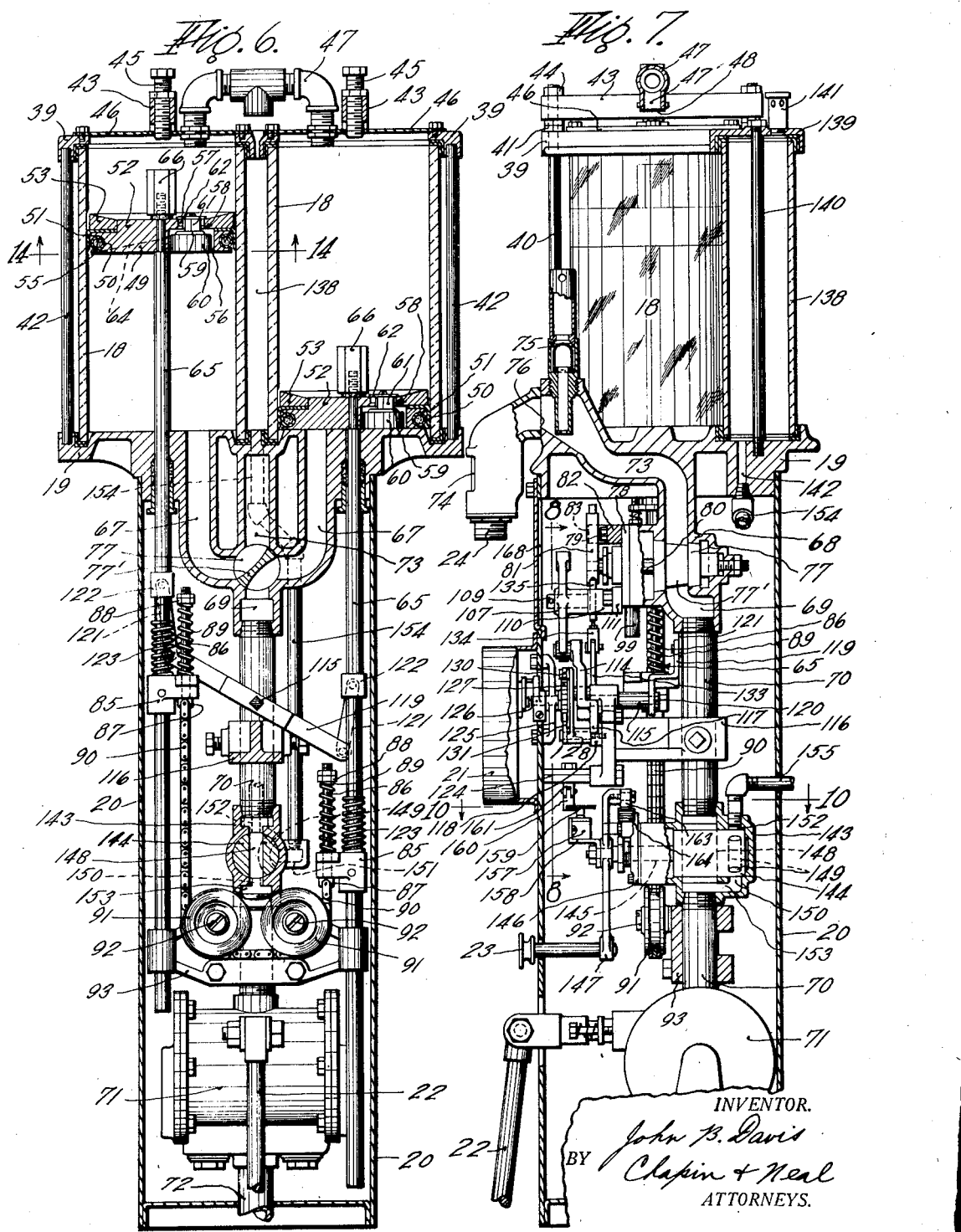

Oct. 21, 1930.                J. B. DAVIS                 1,779,270
                      LIQUID DISPENSING APPARATUS
                       Filed March 31, 1928        5 Sheets-Sheet 5
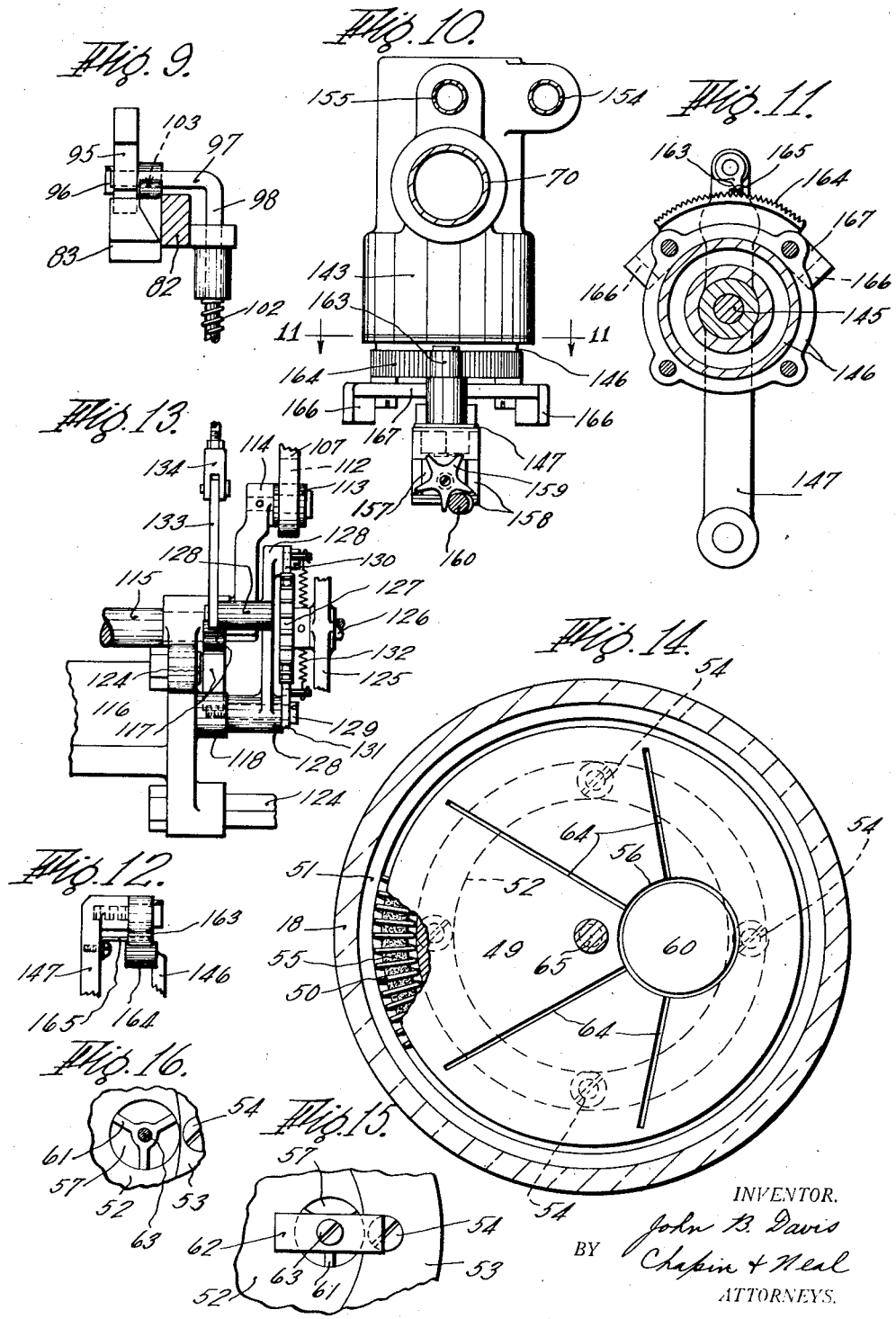
INVENTOR.
John B. Davis
BY Chapin & Neal
ATTORNEYS.

Patented Oct. 21, 1930

1,779,270

UNITED STATES PATENT OFFICE

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS

LIQUID-DISPENSING APPARATUS

Application filed March 31, 1928. Serial No. 266,383.

This invention relates to improvements in liquid dispensing apparatus of a type suitable for use in dispensing gasoline, oils and the like.

The invention, for a full utilization of all its features, is embodied in a so-called twin cylinder dispenser of the visible measuring type, although certain features as will be hereinafter pointed out, are or may be, independent of the twin cylinder arrangement. The use of a pair of measuring cylinders is, however, preferred because one can be filled while the other is discharging. The two measuring cylinders are alternately supplied with liquid under pressure by any suitable means, such as a pump, and the emptying and filling of the cylinders is controlled by a valve which works automatically at the proper times. The attendant simply has to pump or control the pumping and everything else takes place automatically. That is, the liquid is measured within the view of the customer and delivered in substantially an unbroken stream so long as pumping is continued.

This general class of dispenser is to be found in various forms in the art and the present invention is directed to improvements which enable more speedy operation of the apparatus with close accuracy of measurement of the liquid dispensed.

One of the objects of the invention is to provide a piston in each measuring cylinder, which piston will be raised by the incoming liquid as its cylinder is filled, and to interconnect the pistons so that as one is raised the other is lowered and thereby forcibly discharges the liquid at a rapid rate. This arrangement is coupled with a quick acting valve mechanism, the movement of which is controlled and initiated by the position of the pistons in their cylinders, but which proceeds independently of any control by the piston after it has been initiated. The valve is moved practically instantaneously at the very end of each stroke of the piston. The measurement, by positive displacement of the liquid by a piston over a certain stroke, insures accuracy of measurement only when coupled with the valve which reverses almost instantaneously at the end of the piston's stroke. The positive expulsion of the liquid from a measuring cylinder gives speedy delivery and insures that one cylinder empties as fast as the other is filled.

There are many details which contribute to the accomplishment of the above purposes and these will best appear from the following description and will be pointed out in the appended claims.

The invention will be disclosed with reference to the accompanying drawings, in which:—

Fig. 1 is an exterior front elevational view of a housing for the dispensing apparatus;

Fig. 2 is a sectional plan view taken on the line 2—2 of Fig. 1 and drawn to a larger scale;

Fig. 3 is a fragmentary sectional plan view drawn to a still larger scale and taken on the line 3—3 of Fig. 1, the outer housing shown in Fig. 1 being removed;

Fig. 4 is a view taken similarly to Fig. 1 but showing the doors of the housing opened to reveal the dispensing apparatus;

Fig. 5 is a side elevational view of the dispensing apparatus drawn to a larger scale,— the housing therefor being shown in section and part of the casing for the lower part of the apparatus being broken away;

Fig. 6 is a sectional view of the apparatus taken on the line 6—6 of Fig. 5;

Fig. 7 is a cross sectional view taken at right angles to Fig. 6;

Fig. 8 is a front elevational view, taken on the line 8—8 of Fig. 7 and drawn to a considerably larger scale, showing the valve and register operating mechanisms;

Fig. 9 is a sectional view taken on the line 9—9 of Fig. 8;

Fig. 10 is a sectional plan view taken on the line 10—10 of Fig. 7;

Fig. 11 is a sectional view taken on the line 11—11 of Fig. 10;

Fig. 12 is a fragmentary view taken at right angles to Fig. 11 and showing a detail;

Fig. 13 is a fragmentary elevational view taken on the line 13—13 of Fig. 8;

Fig. 14 is a sectional plan view taken on the line 14—14 of Fig. 6;

Fig. 15 is a fragmentary top plan view showing the support for the vent valve in the piston; and Fig. 16 is a sectional plan view taken just below said support and showing the guide for said valve.

The dispensing apparatus includes two transparent measuring cylinders 18 (Figs. 4 and 6) which are disposed side by side with their axes in parallel relation and are supported by a common base member 19. Secured to and depending from this base member is a casing 20, of square cross section (see Fig. 3), which is intended to completely enclose the pump, valve operating mechanisms, register operating mechanism, and all parts to which access is not ordinarily required. As shown in Fig. 4, the register 21, the operating handle 22 for the pump, a valve operating handle 23 and the outlet 24 from the dispensing cylinders are disposed outside casing 20.

The parts of the dispensing apparatus have been arranged very compactly for economy in shipping. The intention is to supply as one unit the dispensing apparatus shown in Figs. 6 and 7 and allow the purchaser to provide means for supporting and housing in the apparatus, according to his own desires. The housing, due to the necessity of supporting the measuring cylinders at a substantial height, is necessarily cumbersome and, by making the dispensing apparatus as a compact unit separate from the housing, much economy in shipping may be effected. Also, the dispensing apparatus can be standardized leaving the housings to be built to suit the various desires of different purchasers.

One illustrative example of how the apparatus may be supported, and housed in, is shown in Figs. 1, 2, 4 and 5. A hollow sheet metal pedestal 25, of hexagonal cross section, is mounted on a base 26 and is surmounted by a hexagonal cap 27. Two adjacent sides of such pedestal are made as separate pieces, hinged at 28, to form doors 29, which may be fastened together and locked as shown in Fig. 1. These doors when fully opened will allow access to the pump handle 22, as will be clear from Fig. 5, and allow the handle to be oscillated back and forth (from the right to the left as viewed in Fig. 4 of the position in which handle 22 is there shown). The cap 27 has an upstanding circular rim 30 to which the lower end of a casing 31 is secured. The upper end of this casing is similarly secured to a cap 32 which, as shown, is adapted to receive an ornamental dome as indicated at 33 in Fig. 1. The casing 31, except for its upper and lower ends, which are cylindrical, is cut away leaving merely two diametrically opposed, upstanding parts 34 of arcuate cross section (Figs. 2 and 5). Two doors 35, mounted to slide in upper and lower circular runways 36 and 37, respectively, are arranged to be moved from the position shown in Figs. 1 and 2, wherein they cooperate with the parts 34 to afford a complete enclosure for the apparatus, to that shown in Fig. 4, wherein the apparatus is substantially exposed. The apparatus may be supported from the housing just described, by pairs of straps 38 (Fig. 4) which are suitably connected to the casing 20 of the apparatus and suitably secured to the parts 34 of the housing.

Referring to Fig. 6, each measuring cylinder 18 is surmounted by an annular ring 39 and the cylinder is held between this ring and member 19 by a pair of studs 40 (Fig. 5), each threaded into member 19 at its lower end and provided at its upper end with a nut 41. The rods 42 shown in Fig. 6 are dummy rods inserted for appearance sake. A cross bar 43 extends diametrically across, and in overlying relation with, the upper end of each cylinder 18 and is supported at its ends from the studs 40 and secured thereto by nuts 44. Secured centrally to cross-bar 43 is an adjustable abutment, in the shape of a stop screw 45. The latter extends into the upper end of its measuring cylinder through an opening in a closure disc 46, which rests upon and is secured to the ring 39. The upper ends of the two cylinders 18 are interconnected by piping 47, secured as indicated, to discs 46 and having a central passage 47′ (Fig. 7) opening to the atmosphere. This passage is preferably screened, as at 48, to prevent ingress of dust and dirt and is so located as to make it difficult for water to enter.

Within each cylinder 18 is a piston, comprising a body 49 (Figs. 6 and 14) which is circumferentially grooved to receive a spring 50. This spring is made up from a suitable length of close wound coil spring, the ends of which are brought together and suitably joined, thereby forming an annulus of appropriate inside diameter to fit in the aforesaid groove. Surrounding spring 50 is the cylindrical part of a cupped piston leather 51. The flat annular part of the leather rests upon the upper face of body 49 and the latter has a central upstanding cylindrical part 52 (Figs. 2 and 6) which passes upwardly through the opening in the leather. An annular ring 53 encompasses part 52, rests on top of the flat annular part of the piston leather and is secured to body 49 by screws 54 (see Figs. 14, 15 and 16). The spring 50, which is compressed to some extent when the piston is inserted in the cylinder, presses radially outward at many points on the cylindrical part of the piston leather 51 and tends to hold the same in close contact with the walls of the glass cylinder. Pressure of liquid beneath the piston also serves the same purpose. The construction is calculated to maintain a fluid tight joint between the piston and the glass cylinder, notwithstanding that the latter may be somewhat irregular and not exactly circular in form. The space within spring 50 is stuffed with packing 55 in order to exclude the volume of liquid which might otherwise enter this space and, under certain conditions, cause a discrepancy in measurement as will later appear.

The piston body 49 has in its lower face a deep cylindrical recess 56 and leading upwardly therefrom through the body is a hole 57. The recess 56 and hole 57 afford a passage through the piston for the purpose of permitting the escape of air from below the piston and for the purpose of venting that portion of the cylinder which lies below the piston. At the intersection of this hole and recess is a valve seat 58 which is adapted to be engaged by a frusto-conical valve 59 carried by the upper face of a cork float 60. Fixed to and extending upwardly from valve 59 is a valve guide 61 (Fig. 16), comprising three angular spaced wings radiating from a common hub, and this guide slides in hole 57. A thin plate 62 (Fig. 15), of a length greater than the diameter of hole 57, is secured, at a point centrally between its ends, to the upper end of the valve guide by a screw 63. Plate 62 serves to support the valve, guide and float when the valve is in the open position shown. Liquid reaching the float will raise the valve and close the air passage. The float nearly fills the recess 56 for reasons similar to those above pointed out. The upper face of member 53 is inwardly inclined so that occasional drops of liquid, which may at times pass through the air passage as air is being expelled, will drain back through the passage. The lower face of member 49 is made perfectly flat and, to avoid trapping air beneath the piston, a series of grooves 64 are provided in said lower face which facilitate the outflow of air. These grooves, which may be increased in number if necessary or desired, radiate from recess 56. Each groove is very narrow and gradually increases in depth from a minimum at its outer end to a maximum at its inner end (Fig. 6).

Each piston 49 is secured to the shouldered down, upper end of a piston rod 65 by a special nut 66, which is adapted to engage the lower end of the abutment 45 to positively limit the extent of upward travel of the piston. Each piston on its down stroke is arrested by the abutment of its flat lower face with the flat upper face of member 19, whereby all liquid between such faces is positively expelled from the cylinder, leaving only such small volumes of liquid as may occupy the spaces around spring 50, float 60 and grooves 64. If the piston is allowed to dwell in its lower position, the small volumes of liquid, just referred to, will also drain out, because vent valve 59 will have time to open. Therefore, there may be a slight difference in measurement under the two conditions of operation. If the piston immediately reverses and starts upwardly the small volumes, referred to, will not be delivered, while if the piston dwells in its lower position such volumes will be delivered. This explains the reason for reducing these volumes to a minimum and in the present apparatus, they have been cut down to such a degree as to be well within the permissible tolerances of measurement.

Each cylinder 18, at its lower end, communicates with a passage 67, formed in member 19, which serves both for the inflow and outflow of liquid. These passages 67 communicate at diametrically opposite points with the interior of a valve housing 68, also formed as an integral part of member 19. A supply passage 69 communicates with the lower side of housing 68 at a point spaced ninety degrees from each passage 67. Passage 69 is connected by a pipe 70 to the discharge side of a suitable pump 71, the suction pipe of which is designated 72 and passes downwardly through the base of casing 20 for connection to a source of liquid supply. A discharge passage 73 (Fig. 7) leads from housing 68 at a point diametrically opposite from passage 69 and extends upwardly and forwardly for communication with the outlet fitting 24. The latter, at one end, is bolted to member 19 and its other end is adapted for connection to the usual dispensing hose. Preferably also, a section 74 of the fitting 24 is transparent so that the purchases may observe the outflow of the liquid dispensed. The discharge passage is provided with the usual air-admission or vent valve 75, which may be of any suitable type acting to prevent siphon action. The passage 73 terminates with a level defining weir 76 located in the same plane as the lower end walls of cylinders 18, whereby the cylinders can drain only to said level.

The valve housing 68 (Fig. 7) contains a plug valve 77 which is of frusto-conical form except that intermediate its ends it is cut away on opposite sides leaving a single diametrically disposed bar 77' (shown in section in Fig. 6). The valve housing has a closed rear end and its front end is closed by a cap 78, secured in place by cap screws 79. Valve 77 has a stem 80, which extends outwardly through a suitable stuffing box in cap 78 and has fixed thereto a lever 81. Secured to cap 78 by the upper pair of the cap screws 79 (Fig. 8) is a horizontal bar 82 which has two laterally-spaced and outwardly-turned lugs 83, which limit the angular movement of the valve actuating lever 81. As shown, the valve can turn ninety degrees and its bar 77' is positioned as shown in Fig. 6, when the lever 81 abuts the right hand lug 83 shown in Fig. 8. When bar 77' is positioned as in Fig. 6, the left hand cylinder 18 is connected to the discharge passage 73 and the right hand cylinder 18 is connected to the supply passage 69. When lever 81 is moved in a counterclockwise direction until it abuts the left hand lug 83, bar 77' will be so positioned as to connect the supply passage 69 to the left hand cylinder 18 and the discharge passage 73 to the right hand cylinder.

The piston rods 65 are interconnected so that as one piston is raised by the liquid pumped into its cylinder, the other piston is forced downwardly to rapidly expel the liquid in its cylinder, thereby securing a more speedy discharge of the liquid than could be obtained by gravity flow alone. Also, the valve 77 is operated by means controlled by the position of the pistons, as will later be described in detail, so that the valve is reversed in position whenever a piston abutment 66 engages the fixed abutment 45. When the piston is at the top of its stroke, the cylinder contains, between the lower face of the piston and the upper face of member 19, some definite measured volume as for example, one gallon or five liters. Theoretically, the stroke of both pistons should be equal but as a practical matter these glass cylinders are seldom exactly uniform and it is necessary to provide means, such as the stop screws 45, that enable the stroke of one piston to vary from that of the other. It is also necessary to incorporate in the connections between the two piston rods, provisions that will permit the strokes of different lengths.

Referring now to the latter provisions, each piston rod 65 has fixed thereto an arm 85 (Figs. 6 and 8) which receives a rod 86 slidable in a direction parallel to that of the piston rod. Fixed to the lower end of each rod 86 is an abutment 87 and adjustably mounted near the top of each rod is an abutment 88 in the shape of a nut threaded on the rod. A spring 89 is interposed between nut 88 and the upper face of arm 85 and tends to hold abutment 87 in contact with the lower face of the arm. The two abutments 87 are connected together by a flexible member, such as the sprocket chain 90, which is appropriately guided by a pair of grooved rollers 91, mounted on studs 92, secured to a bracket 93, fixed to pipe 70. It will be observed from Fig. 6 that when one piston is arrested in its down stroke by abutment with member 19, the other cannot reach the end of its upstroke except by first compressing springs 89. These springs yield to compensate for the inequality in stroke of the two pistons and they may be used solely for this purpose alone or for the additional purpose set forth below.

The length of chain 90 is such that when one piston has reached the lower end of its stroke and come into abutment with member 19, the other piston has yet to travel a substantial distance before reaching the end of its upstroke. The abutments 45 and 66 are at that time separated by the distance shown in Fig. 6 in connection with the left hand cylinder. As liquid continues to enter this left hand cylinder under the pumping pressure, the left hand piston continues to rise, the springs 89 compressing to permit such movement. The piston continues to rise until the abutments engage at which time the valve 77 is quickly reversed and moved into the position illustrated in Fig. 6, thereby connecting the left hand cylinder to the discharge passage 67. Immediately that this happens, the springs 89 are free to expand and do so, thereby imparting a sharp kick to the left hand piston and moving it into the illustrated position. This sets the liquid rapidly in motion and has been found to be a feature which is most important in that it contributes to the speedy delivery of the liquid, even through a crooked or trapped hose. On the described reversal of valve 77, liquid will enter the right hand cylinder, raise the piston therein and thereby lower the left hand piston until the latter abuts member 19. Thereafter, the right hand piston will continue to rise until abutments 45 and 66 engage, thereby again stressing springs 89. On engagement of such abutments, the valve 77 will move to connect the right hand cylinder to the discharge passage and the springs 89 will expand and start the right hand piston rapidly in motion on its downward stroke.

The valve 77 is operated with great rapidity by elastic means which are placed under stress by the movement of the piston rods but which are not released for action until a piston reaches the end of its upward stroke. Referring to Figs. 3 and 8, the outer end of the valve lever 81 has formed thereon a latch piece 94 adapted to be engaged by one or the other of a pair of latches 95, mounted one near each end of cross bar 82. Each latch is pivotally mounted on a stud 96 secured to the cross bar and also is drilled to receive the upper and forwardly bent end 97 of a rod 98, mounted for vertical sliding movement in a bearing on cross bar 82. The lower end of each rod 98 is threaded to receive an adjustable abutment 99, provided with a slot 100. A pin 101 passing through this slot and rod 98 holds the abutment in adjusted position. A spring 102, coiled around rod 98 acts between the upper end of the abutment 99 and the lower end of the bearing for rod 98, tends to move the latter downwardly and hold the latch 95 in latching position. Such position is defined by the engagement of the end 97 of rod 98 with a stop 103 formed on cross bar 82 (see also Fig. 9). Each abutment 99 lies in the path of one of the arms 85 and is adapted to be engaged by the surface 104 thereof. As the right hand piston moves upwardly, surface 104 of the arm 85 on the right hand piston rod will engage abutment 99 at almost the very end of the upward stroke and will move latch 95 to release lever 81 at the end of said stroke. Only a very small angular movement of the latch is necessary to release the lever and by adjustment of abutment 99 on rod 98, the release may be made to occur at the instant the abutment 66 on the piston engages the overlying abutment 45. When the latch is released lever 81 swings to the left, as viewed in Fig. 8, and is then held by the left hand latch 95, until subsequently released at the end of the upward stroke of the left hand piston in a manner similar to that described.

The elastic means for moving lever 81 from one to the other of its two positions consists of a spring 105 which is coiled around a rod 106. The latter at one end has a head 106' (Fig. 3) which is pivotally connected to a lever 107. The other end of rod 106 is slidable in a fork 108, swivelled to the valve lever 81. The spring acts between the fork and head 106' tending to spread them apart. The lever 107 is mounted, at a point intermediate its ends, to turn on a stud 109 which projects forwardly from a hub 110 on a cross bar 111, secured to the cap 78 of the valve housing 68 by the lower pair of cap screws 79. The lower end of lever 107 has a slot 112 which receives a roll 113, mounted on the upper end of a lever 114. This lever 114 is fixed to the forward end of a shaft 115 (Figs. 7 and 13) which is mounted in a bracket 116, fixed as shown in Fig. 7 to supply pipe 70. The lower end of lever 114 is formed with two diverging arms 117 (Fig. 8) which are offset rearwardly (Figs. 7 and 13) so as to lie in the path of a hub 118 which projects forwardly from bracket 116. The lever 114 is limited in its swinging movement by the abutment of the arms 117 with hub 118 and, as shown, the right hand arm is held against the hub by the pressure of drive spring 105.

The rear end of shaft 115 is squared (Figs. 6 and 8) and fits in a square hole which is formed in the center of a lever 119, being held thereto by a nut 120 (Fig. 7). This lever near each end is offset rearwardly so that its ends lie in back of the piston rods 65 (Figs. 3 and 6) and each such end is connected by a link 121 to a piece 122, which loosely encompasses the adjacent piston rod. Below each slide piece 122 is a spring 123 which encompasses the piston rod and rests upon arm 85. As the right hand piston rod 65 (Fig. 6) moves upwardly, the spring 123 thereon will engage the overlying slide piece 122 and move it upwardly, thereby rocking lever 119 in a counterclockwise direction. Such movement of lever 119 (Fig. 8) will, through lever 114 move lever 107 in a clockwise direction, thereby compressing spring 105. The rod 106 slides in lug 108 to permit this action. The stressing of spring 105 by upward movement of the right hand piston rod continues until the left hand arm 117 of lever 114 engages hub 118. Thereafter, the slight additional movement of the piston rod, necessary to cause abutment 66 to engage stop screw 45, simply compresses spring 123. The latter does not yield, at least materially, up to the time when arm 117 engages hub 118.

The stop, provided by the engagement of the two last named elements, is necessary because the point of pivotal connection of lever 107 to rod 106 crosses the line of centers which connects stud 109 to the center of oscillation of fork 108. This crossing of said line of centers occurs at about the end of the operation of stressing spring 105 and as a result, the direction in which spring 105 acts on fork 108 is changed. The spring then tends to move valve lever 81 to the left but is restrained for the moment from so doing by latch 95. The spring also tends to move lever 107 still further in a clockwise direction but is restrained by the engagement of elements 117 and 118. As soon as latch 95 is released, spring 105 expands and drives lever 81 with great rapidity into its left hand position, in which it is immediately held by the left hand latch 95. On an upward movement of the left hand piston rod 65, the lever 119 will be rocked in a clockwise direction which will result in a counterclockwise movement of lever 107 whereby spring 105 will be again stressed and, near the end of the stressing action, turned so that it will tend to move valve lever 81 to the right.

The register 21 is arranged to indicate the number of unit measured quantities dispensed by counting the number of operations of the valve lever. This register is supported by three studs 124, from the bracket 116, above described. Fixed to the back of frame 125 in which register 21 (Fig. 7) is a frame 125 in which the register operating shaft 126 is mounted. This shaft (Fig. 8) has fixed thereto a ratchet 127. In back of the ratchet and arranged to swing freely in the space between the front end of shaft 115 and the rear end of shaft 126 (Fig. 13), is an approximately Y-shaped lever 128 (Fig. 8) which is pivoted on a stud 129 secured to hub 118. One of the two upwardly diverging arms of this Y-shaped lever carries a pawl 130 for actuating the ratchet 127. A holding pawl 131 is pivotally mounted on stud 129 and these pawls are interconnected by a coil spring 132, which lies in front of the ratchet (Fig. 13) and tends to hold both pawls in engagement therewith. The other of the aforesaid arms is connected by a link 133 to a fork 134. The latter is adjustably secured to a rod 135 which is mounted for vertical sliding movement in the hub 110, above described. The upper end of rod 135 underlies one or the other of a pair of cams 136, formed on the lower end of valve lever 81, and is held in engagement therewith by a spring 137 which connects a pin on said hub to link 133. The connection between rod 135 and fork 134 is such as to permit the effective length of these combined pieces to be increased or decreased. As the valve lever 81 swings from one to the other of its two extreme positions, one or the other of the cam faces 136, will depress rod 135 and thereby rock lever 128 in a counterclockwise direction. Such movement of this lever will cause pawl 130 to advance ratchet 127 by one step and this in turn will, by the usual mechanism (not shown) of the register 21, cause an appropriate movement of the register hand 21' (shown in Fig. 4). The ratchet is moved only during the first half of each movement of the lever 81, and, on the other half of such movement, rod 135 is permitted to rise under the influence of spring 137, which causes pawl 130 to move back into its original position, the ratchet 127 being held against movement by pawl 131.

There is sometimes a demand for the liquid to be dispensed in quantities less than that dispensed by one of the cylinders 18 and to satisfy such demand, I provide an additional transparent measuring cylinder 138, which may for example hold one quart or one liter. This cylinder is located between and in back of the large cylinders (Figs. 2 and 7). It is provided with a separate cap 139 and is held to member 19 by a long stud 140 which passes through the cap and cylinder and threads into said member. The cap 139 has a vent valve 141, which functions similarly to the valves 59 in pistons 49. That is, the valve permits air to leave the cylinder while the latter is being filled; closes when the liquid fills the cylinders; and opens to vent the cylinder during discharge of its contents. A passage 142 is provided through member 19 leading into the base of cylinder 138 and this passage serves for both the supply and discharge of the liquid.

Interposed in the supply pipe 70 between the pump 71 and valve housing 68 is a valve housing 143 which contains a plug valve 144 having an actuating stem 145, extending out of the housing through a suitable stuffing box in a cap 146. A lever 147 is fixed, at a point intermediate its ends, to stem 145 and the lower arm of this lever has fixed thereto the heretofore-described part 23 which extends through and outside casing 20. Part 23 normally occupies the position shown in Fig. 4 but can be moved to the left of that position to the position marked "Fill" and subsequently to the right to the position marked "Disch" to enable the cylinder 138 to be filled and discharged. Valve 144 (Fig. 7) is provided near its front end with a passage 148 adapted, when handle 23 occupies the position shown in Fig. 4, to interconnect the two sections of supply pipe 70 in a manner which will be clear from Fig. 6. Near the rear end of valve 144 is a curved passage 149 which, when handle 23 is in fill position, connects a port 150 to a port 151 and when in discharge position connects the port 151 to a port 152. The ports 150, 151 and 152 are formed in casing 143 at points spaced ninety degrees apart and the port 150 is constantly connected to the lower section of discharge pipe 70 by a cross passage 153 (Fig. 7). Port 151 is connected by piping 154 to the passage 142 of cylinder 138. The course of this piping is fully indicated in Fig. 6 and its connection to cylinder 138 appears in Fig. 7. The port 152 is connected to fixed piping 155 (Fig. 7) which leads outside casing 20 and this piping is connected, as indicated in Fig. 5, by a flexible pipe 156 to the outlet pipe 24. Thus, when handle 23 is turned to fill position, passage 148 will be turned out of registration with the two sections of supply pipe 70 and the lower section of such pipe will be connected to piping 154, whereby cylinder 138 may be filled. After the liquid rises high enough to close vent valve 141, the operator is unable to pump any more and thereby knows that cylinder 138 has been completely filled. He then turns handle 23 to discharge position, which allows the cylinder 138 to drain down to the level of the upper face of member 19. The piping 154, 155 and 156 is, of course, always full of liquid and none of this can be delivered through outlet 24.

Registration of the quantities delivered from cylinder 138 is effected by a separate counter 157, of the ordinary cyclometer type. This counter is suitably secured to a bracket 158 attached to lever 147 (Figs. 7, 8 and 10) and has the usual star wheel 159. The latter, when turned in a counterclockwise direction as viewed in Fig. 10, will operate the counter. A cylindrical pin 160 lies in the path of the teeth of the star wheel. This pin is pivoted to a fork 161 secured to the lower stud 124 and can swing counterclockwise, as viewed in Fig. 8, when star wheel 159 is bodily moved to the right by the movement of lever 147 into fill position. No turning movement of the star wheel results and pin 160 drops back into a vertical position. The pin 160 cannot swing in a clockwise direction beyond said position because of the engagement of a shoulder 160' on the pin with fork 161. Consequently, when star wheel is bodily moved to the left by the movement of lever 147 into discharge position, the star wheel will be turned one fifth of a revolution when one of its teeth engages pin 160. As lever 147 is moved back to neutral position no turning movement of the star wheel takes place.

In order to avoid improper operation of valve 144, means are provided which oblige the operator to manipulate lever 147 in the following manner, viz., first,—he must first move it to fill position, movement in the reverse direction being prevented; second, he must move the lever completely to fill position before being able to move it to discharge position; third, the lever once started towards discharge position must be moved all the way to such position before it can be returned to neutral position. These results are accomplished simply by a reversible pawl 163 which plays over a serrated segment 164. The segment is formed as a part of cap 146. The pawl 163 is pivotally connected to the upper end of lever 147 and is perforated to receive the outer end of a spring 165 which, at its other end, is secured to lever 147 as best shown in Fig. 12. This spring 165 in its unflexed form is straight and tends to hold pawl 163 with its point positioned vertically below its pivot. The distance between the center of the pivot of pawl 163 and the free end of the pawl is slightly greater than the distance measured along the line of centers of pawl 163 and stem 145 between the center of the pivot and the arc of segment 164. As shown in Fig. 11, movement of the upper arm of lever 147 to the right is prevented by the pawl 163 while movement to the left, which will turn the valve to fill position, is permitted. It will be obvious that the pawl will prevent the said arm of the lever from moving to the right until the lever has completed its movement in this direction. The movement of lever 147 is limited by a pair of lugs 166 formed on a cross bar 167 secured to cap 146. When lever 147 abuts the left hand lug 166, pawl 163 will have moved off the left hand end of segment 164 and will have been swung back by spring 165 into a radial position with respect to the center of lever 147. Movement of lever 147 toward the right hand lug in Fig. 11 will now be permitted but, once this movement is started, the pawl will prevent retrograde movement. This forces the operator to move the lever to discharge position and operate the counter 157 to the desired degree. As lever 147 abuts the right hand lug, pawl 163 rides off the right hand end of the segment and permits the lever to be moved back to neutral position.

To enable access to the actuating mechanism for valve 77, the casing 20 is provided with a removable door 168, which is held in place by a pair of cap screws 169. The latter are preferably drilled to receive a wire 170 which is passed through the heads of both cap screws. The ends of wire 170 are sealed as indicated at 171.

The operation of the apparatus will now be described, assuming that the parts occupy the relative positions shown in Fig. 6. That is, the left hand cylinder 18 is filled with liquid to the level of its piston 49 and such piston has been moved part way on its down-stroke by the expansion of the two springs 89, which were compressed during the latter part of the preceding upstroke of that piston. The other piston 18 is at the lower end of its cylinder and valve 77 has been moved to connect the right hand cylinder to supply pipe 70 and the left hand cylinder to discharge pipe 24. On actuation of pump 71, liquid will enter the right hand cylinder 18 and raise the piston therein. The raising of the right hand piston will, through flexible member 90, cause the left hand piston to descend, thereby positively forcing the liquid out of the left hand cylinder and into pipe 24. When the left hand piston has completed its discharge stroke and come into abutment with member 19, the right hand piston will not have yet reached the end of its upstroke. Pumping being continued, the right hand piston is forced to rise until its abutment 66 engages the overlying abutment 45. Meanwhile, since the left hand piston cannot move further in a downward direction, the springs 89 are compressed. As the right hand piston travels upwardly, the spring 123 engages slide-piece 122 and raises the same, thereby rocking levers 119, 114 and 107 and causing the valve spring 105 to be compressed between members 106' and 108. At the end of the upstroke of the right hand piston, the part 104 engages abutment 99 and lifts the same far enough to release lever 81 from latch 95. This release occurs simultaneously with the engagement of the abutment 66 on the right hand piston with the overlying abutment 45. On release of lever 81, it is driven by the expansion of spring 105 into its left hand position (Fig. 8) and thereby valve 77 is moved to connect the right hand cylinder to discharge pipe 24 and the left hand cylinder to supply pipe 70. The right hand piston is then moved by the expansion of springs 89 and started on its discharge stroke. The left hand piston immediately starts upwardly and continues the downward movement of the right hand piston which was initiated by springs 89. There is no interruption in the downward movement of either piston but there is a noticeable sharp kick in the initial movement of each piston, due to the spring impulse which starts it rapidly in motion and imparts momentum to the column of liquid below it to accelerate the discharge. The left hand cylinder is filled and, at the end of the upstroke of the left hand piston, the valve 77 will be reversed in a manner similar to that described.

The described action continues as long as pumping continues, each cylinder alternately filling and discharging and each cylinder discharging while the other is filling and vice versa. The result is the delivery of a practically uninterrupted stream of liquid from the apparatus. Speedy delivery is obtained by reason of the use of pistons for forcibly discharging the cylinders, as distinguished from discharge by gravity flow alone. For example, from 12 to 14 gallons per minute can be dispensed with the apparatus and this speed is made possible through the automatic shifting of the valve and the arrangement, whereby liquid is forced out from one cylinder as rapidly as it is forced into the other cylinder. This offers a distinct improvement over the arrangement, wherein the force for expelling liquid from one cylinder is transmitted from the rising liquid in the other cylinder by means of a column of air. The air compresses to a considerable extent and does not serve as efficiently for the purpose as does the described inelastic transmission. In addition, when the pistons are started on their discharge stroke, as is preferred, this contributes materially to speedy discharge of the liquid, especially under unfavorable conditions as where the delivery hose is bent into a crook and forms a liquid trap.

Referring now to the stopping of the apparatus, except for the arrangement whereby each piston has a dwell at the end of its discharge stroke, it would be difficult for the operator to stop pumping so that the pistons would come to rest exactly at the end of such strokes. Therefore, the dwell arrangement has an advantage in that it enables the operator, without much trouble, to stop pumping at the proper time. That is, the operator can stop pumping at any time during the interval after the abutment of one piston with member 19 and before the abutment of the member 66 on the other piston with stop 45. This, however, is not necessary except to secure speedy delivery of the last gallon, because the arrangement is such as to permit the last gallon or, if desired, the last part of the last gallon to be delivered by gravity flow. Suppose, for example, that the customer has had nine of the desired ten gallons delivered from the apparatus when the parts are positioned as shown in Fig. 6, the operator can stop pumping at any time during the rising movement of the right hand piston, and the last gallon will drain from the left hand cylinder by gravity flow, due to the provision of the air vent in the piston. Generally speaking, the customer desires a slower delivery of the last gallon in order to avoid overflowing his tank which may then be nearly full. However, if speed is desired, the operator can readily gauge his pumping so that, in the example mentioned, the right hand piston will stop short of, but close to, the stop screw 45, thereby forcibly expelling all of the last gallon. The liquid pumped into the right hand cylinder in order to secure the speedy ejection of the last gallon, remains there in readiness for the next customer.

From the foregoing, it will be seen that there will normally be some air in one of the cylinders beneath its piston. Such air is expelled through the valve-controlled vent in the piston, when the pump 71 is again operated. Assume for example, that the left hand cylinder was left partly filled with air below its piston and that the right hand cylinder is partly filled with liquid, when pumping is again commenced, most of this air will be driven out through the open vent valve during the down stroke of the left hand piston, but the valve remains open until liquid enters and expels the remainder of the air during the early part of the upstroke of this piston. The valves 59 function, for the most part, only during the first and last of a succession of cycles of operation. That is, they permit the air to be driven out of the cylinders on starting the pump and they vent the cylinders to permit drainage of the last gallon or part thereof. They may or may not function in intermediate cycles of operation according to whether the pistons dwell in their lower position or not. As illustrated, each piston dwells in its lower position and its valve 59 will open so that all the liquid, including that in the grooves 64, the spaces between the coils of the spring 50 and that around float 60, is delivered. This arrangement is preferred, not only because it enables the spring impulse on the pistons, but because it tends toward the deliveries of uniform quantities of liquid from the cylinders under all conditions. That is, since one piston must drain at least in part by gravity flow, at the end of the last of a series of successive operations, it has been arranged to have each piston dwell during intermediate operations of the series. In this way, valve 59 will open at the end of each downstroke of the piston whether the contents are forcibly expelled or pass out by gravity flow. The customer then gets all the liquid pumped into the cylinder including that in said grooves and spaces.

The apparatus is nevertheless workable in commercially satisfactory form even if the dwell of the pistons at the end of their discharge strokes is eliminated and with it the spring impulse, although both these features are important and preferred. By suitable adjustments, one piston may be made to reach its upper limit when the other reaches its lower limit and in such case there would be no dwell of either piston until pumping ceased. Then valves 59 would not open at the end of any discharge stroke except the very last of the series. Consequently, the liquid in grooves 64 and the aforesaid spaces would not be delivered except with the last of the series of unit quantities dispensed. Therefore, there would under such conditions be a difference in measurement depending on whether liquid is forced out by the pistons or flows out by gravity. It is therefore important that the total volume of all the spaces in each piston, which are located above the level of the flat bottom face thereof and into which liquid can enter, be kept down to as low a figure as possible. If the grooves 64 were omitted, a reduction in said volume could be effected but there would then be a possibility of trapping some air below the piston and this might introduce an error which would more than offset that due to the small volume of these grooves. As hereinbefore set forth, the volume of these grooves is exceedingly small and the discrepancy which may under certain conditions occasionally be caused by them is not appreciable, being well within the tolerances permitted by the underwriters. Therefore, since the grooves have a real useful purpose in avoiding the trapping of air beneath the pistons and facilitating the expulsion of air from the cylinders, they are thought important and are preferably employed.

The invention has been disclosed herein, in an embodiment at present preferred, for illustrative purposes, but the scope of the invention is defined by the appended claims rather than by the foregoing description.

What I claim is:

1. A liquid dispensing apparatus, comprising, a pair of upright measuring cylinders in part of transparent material, a piston in each cylinder, a supply conduit, a discharge conduit, valve means for connecting the lower end of one of said cylinders to the supply conduit while the lower end of the other is connected to the discharge conduit and movable to reverse such connections, means for forcing liquid under pressure through the supply conduit, whereby one of said pistons is raised as its cylinder fills, connections between the pistons whereby the rising piston forces the other piston downwardly to expel the contents of its cylinder, means stressed by movement of the connected pistons for moving said valve means, latching means restraining said means from moving the valve means, and means operable at the end of each stroke of each piston to release said latching means and permit the stressed means to rapidly shift said valve means.

2. A liquid dispensing apparatus, comprising, a pair of upright measuring cylinders in part of transparent material, a piston in each cylinder having a passage permitting air to flow therethrough in either direction, a valve in each piston controlling said passage, a float in each cylinder to operate the valve therein, a supply conduit, a discharge conduit, valve means for connecting the lower end of one of said cylinders to the supply conduit while the lower end of the other is connected to the discharge conduit and movable to reverse the connections, means for forcing liquid under pressure through the supply conduit, whereby one of said pistons is raised as its cylinder fills, connctions between the pistons whereby the rising piston forces the other piston downwardly to expel the contents of its cylinder, means stressed by movement of the connected pistons for moving said valve means, latching means restraining said means from moving the valve means, and means operable at the end of each stroke of each piston to release said latching means and permit the stressed means to rapidly shift said valve means.

3. A liquid dispensing apparatus, comprising a pair of measuring cylinders, a piston in each cylinder, means for supplying liquid under pressure alternately to one end of each of said cylinders, a common discharge conduit for said end of said cylinders, valve means for controlling the supply to and the discharge from said cylinders and arranged to connect one to the supply while the other is connected to discharge, connections between said pistons whereby the movement of one in one direction forces the other in the opposite direction, means for adjusting the stroke of each piston independently of the other to secure the delivery of equal quantities of liquid from each cylinder, said connectons including means permitting unequal strokes of the two pistons, and means operable at the end of each stroke of the connected pistons to suddenly actuate said valve means.

4. A liquid dispensing apparatus, comprising, a pair of measuring cylinders including a common head for one end of each, a piston in each cylinder limited in its movement in one direction by abutment with said head, stops, one for each piston to limit the movement thereof in the opposite direction, means for supplying liquid under pressure alternately to said end of said cylinders, a common discharge conduit for said end of said cylinders, valve means for controlling the supply to and the discharge from said cylinders and arranged to connect one to the supply while the other is connected to discharge, said stops being independently adjustable whereby the strokes of the pistons may be varied as necessary to make each displace the same quantity of liquid from its cylinder, connections between the pistons whereby the movement of one in one direction causes a movement of the other in the opposite direction, said connections including yieldable means allowing for unequal strokes of the two pistons, and adjusting means whereby the stroke of each piston may be adjusted independently of the other, and means operable at the ends of each stroke of the connected pistons for suddenly actuating said valve means.

5. A liquid dispensing apparatus, comprising a pair of measuring cylinders, a piston in each cylinder, means for supplying liquid under pressure alternately to one end of each of said cylinders, a common discharge conduit for said end of said cylinders, valve means for controlling the supply to and the discharge from said cylinders and arranged to connect one to the supply while the other is connected to discharge, connections between said pistons whereby the movement of one in one direction forces the other in the opposite direction, said connections including yieldable means allowing for unequal strokes of the two pistons, and means whereby the stroke of one piston may be adjusted independently of the other to secure the delivery of equal quantities of liquid from each cylinder, said connections also including means for independently varying the position of the pistons in their cylinders, and means operable at the end of each stroke of the connected pistons to suddenly actuate said valve means.

6. A liquid dispensing apparatus, comprising, an upright measuring cylinder, a piston therein having a passage therethrough, a valve controlling said passage, a float for operating said valve and causing the same to close said passage when liquid reaches the piston, and means for supplying liquid to the cylinder at a point beneath the piston, said piston having in its lower face a series of grooves radiating from said passage.

7. A liquid dispensing apparatus, comprising, an upright measuring cylinder, a piston therein having a passage therethrough, a valve controlling said passage, a float for operating said valve and causing the same to close said passage when liquid reaches the piston, and means for supplying liquid to the cylinder at a point beneath the piston, said piston having in its lower face a series of grooves radiating from said passage, each of said grooves increasing in depth from a minimum at its outer end to a maximum at its inner end.

8. A liquid dispensing apparatus, comprising, a hollow casing, a frame member surmounting the casing, a pair of upright measuring cylinders supported on top of said member with their axes vertically disposed, a piston in each cylinder, piston rods one for each piston extending through said member and downwardly into said casing, valve means for controlling the supply to and the discharge from said cylinders, an operating member located between said piston rods and below the lower ends of said cylinders, said member connected to actuate said valve means and movable between two extreme positions, a pair of latches one adjacent each of said positions and adapted to positively hold said member in one or the other of said extreme positions, means connecting said piston rods so that the raising of one will lower the other, spring means tending to move the member from one of said positions to the other, means operable by and during part of the stroke of said piston rods for stressing said spring means, and means operable at each end of the stroke of each piston to release said member from its holding latch and allow said stressed means to suddenly move the member.

9. A liquid dispensing apparatus, comprising, a hollow casing, a frame member surmounting the casing, a pair of measuring cylinders supported on top of said member with their axes vertically disposed, a piston in each cylinder, piston rods one for each piston extending through said member and downwardly into said casing, valve means for controlling the supply to and the discharge from said cylinder, an operating member located between said piston rods and below the lower ends of said cylinders, said member connected to actuate said valve means and movable between two extreme positions, a pair of pivoted latches one adjacent each of said positions and adapted to positively hold said member in one or the other of said extreme positions, means connecting said piston rods so that the raising of one will lower the other, spring means tending to move the member from one of said positions to the other, means operable by and during part of the stroke of said piston rods for stressing said spring means, trip rods connected one to each latch and each depending downwardly alongside a piston rod, an abutment on each trip rod, and an abutment on each piston rod, each trip rod abutment adapted to be engaged by the adjacent piston rod abutment at the upper end of the stroke of said piston rod and moved to release its latch.

10. A liquid dispensing apparatus, comprising, a pair of upright measuring cylinders, a common base member on which said cylinders are supported and by which their lower ends are closed, a valve mounted in said member below said cylinders, said member provided with passages for connecting said valve to the lower end of each cylinder and with a supply and a discharge passage, said discharge passage extending upwardly and having a weir located in the same plane as the lower ends of said cylinders, said valve arranged to connect each cylinder passage alternately to the supply and discharge passages so that one cylinder fills while the other empties, a piston in each cylinder, connections between the pistons so that as one is forced up in its cylinder by the entering liquid the other is forced down to expel the liquid in its cylinder, the lower face of each piston adapted to abut said base member and force out liquid to the level of said weir, and means controlled by movement of the pistons for operating said valve.

11. A liquid dispensing apparatus, comprising, a pair of upright measuring cylinders, a common base member on which said cylinders are supported and by which their lower ends are closed, a valve mounted in said member below said cylinders, said member provided with passages for connecting said valve to the lower end of each cylinder and with a supply and a discharge passage, said discharge passage extending upwardly and having a weir located in the same plane as the lower ends of said cylinders, said valve arranged to connect each cylinder passage alternately to the supply and discharge passages so that one cylinder fills while the other empties, a piston in each cylinder, connections between the pistons so that as one is forced up in its cylinder by the entering liquid the other is forced down to expel the liquid in its cylinder, the lower face of each piston adapted to abut said base member and force out liquid to the level of said weir, each piston having an air vent passage therethrough, a valve controlling each vent passage and opening automatically to enable liquid to drain from said cylinders down to the level of said weir, and means controlled by movement of the pistons for operating said valve.

12. In a liquid dispensing apparatus, an upright measuring cylinder, a piston therein, a conduit leading into the lower end of said cylinder, a supply conduit, a discharge conduit having an overflow weir located in the same plane in which the lower face of the piston is located when the piston is at the lower end of its stroke, a valve for alternately connecting the first named conduit to the supply and discharge conduits, and said piston having a vent passage, and a valve controlling said passage and opening the same when the piston is at the lower end of its stroke to permit the contents of the cylinder to drain to the level of said weir.

13. In a liquid dispensing apparatus, an upright measuring cylinder, a piston therein, a conduit leading into the lower end of said cylinder, a supply conduit, a discharge conduit having an overflow weir located in the same plane in which the lower face of the piston is located when the piston is at the lower end of its stroke, a valve for alternately connecting the first named conduit to supply and discharge conduits, and said piston having a vent passage, a valve controlling said passage and opening the same when the piston is at the lower end of its stroke to permit the contents of the cylinder to drain to the level of said weir, a coil spring and a cupped leather packing associated with said piston, and means filling the space within the coil spring to exclude liquid therefrom.

14. In a liquid dispensing apparatus, an upright measuring cylinder, a piston therein, means for forcing liquid into said cylinder at a point beneath the piston to raise the same, a discharge conduit, means operable at the end of the upstroke of said piston to connect said cylinder to said conduit and at the end of the downstroke of the piston to connect said cylinder to said forcing means, and elastic means stressed by the upward movement of said piston for imparting thereto a spring impulse and initiating the downstroke thereof when said means connects said cylinder to said discharge conduit.

15. In a liquid dispensing apparatus, a pair of measuring cylinders, a piston in each movable between fixed limits, connections between said pistons whereby the movement of one in one direction causes a movement of the other in the opposite direction, liquid forcing means, a discharge conduit; means operable when the piston in one cylinder reaches one of its limits to connect said cylinder to said forcing means, whereby it may be moved away from said limit by the forced liquid, and at the same time to connect the other cylinder to said conduit; said means being operable as the piston in the other cylinder reaches the limit corresponding to said last named limit to connect the last named cylinder to said forcing means and the first named cylinder to said discharge conduit, and elastic means included as part of said connections for permitting one piston to travel far enough to reach one of its limits after the other piston has reached its opposite limit.

16. In a liquid dispensing apparatus, a pair of cylinders, a piston in each cylinder movable between fixed limits, connections between said pistons forcing them to move in opposite directions and arranged so that each piston reaches one of its limits before the other piston reaches the opposite limit, said connections including elastic means which permit the travel of either piston after the other has reached one of its limits and which are stressed by such travel, and means for alternately supplying liquid under pressure to said cylinders and for enabling one cylinder to discharge while the other is filling, said elastic means being stressed during the filling of each cylinder and relieving its stress at the start of the discharge of that cylinder.

17. In a liquid dispensing apparatus, a pair of measuring cylinders, a piston in each cylinder, a flexible member serving to interconnect the pistons, guiding means to so direct said member that the pistons are forced to move in opposite directions, elastic means interposed in said flexible connection between the pistons, means for supplying liquid alternately to one end of each cylinder and for discharging liquid from such end of one cylinder while the other is being filled, whereby one piston is moved by the liquid supplied to its cylinder under pressure and moves the other piston to force the liquid out of the other cylinder, and means for arresting each piston at the end of its discharge stroke before the other piston has reached the end of its filling stroke, whereby said elastic means is stressed near the end of the filling stroke of each piston and imparts a spring impulse to such piston to initiate its discharge stroke.

18. In a liquid dispensing apparatus, a pair of upstanding cylinders disposed side by side, a piston in each cylinder having a piston rod depending through one end thereof, a flexible member, elastic means through the intermediary of which the ends of said member are connected one to each piston rod, guiding means directing said member to travel in a path in part parallel and adjacent to one piston rod, across towards the other piston rod and then parallel and adjacent to the last named rod, means for alternately supplying liquid under pressure to the lower ends of said cylinders and for enabling one cylinder to discharge while the other is filling, whereby the liquid supplied to one cylinder raises the piston therein and through said flexible member lowers the other piston to forcibly expel the contents of the other cylinder, and means for arresting the discharge movement of each piston before the other piston has completed its filling stroke, whereby said elastic means will be stressed and impart an impulse to start each piston on its discharge stroke.

In testimony whereof I have affixed my signature.

JOHN B. DAVIS.